United States Patent
Ramaswamy

(10) Patent No.: US 9,417,689 B1
(45) Date of Patent: Aug. 16, 2016

(54) ROBUST DEVICE MOTION DETECTION

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 622 days.

(21) Appl. No.: 13/896,998

(22) Filed: May 17, 2013

(51) Int. Cl.
*G06F 3/01* (2006.01)

(52) U.S. Cl.
CPC ........................................ *G06F 3/01* (2013.01)

(58) Field of Classification Search
None
See application file for complete search history.

(56) References Cited

U.S. PATENT DOCUMENTS

| | | | | |
|---|---|---|---|---|
| 6,764,440 B2 * | 7/2004 | Iddan | ................ | A61B 1/00036 348/76 |
| 7,848,542 B2 * | 12/2010 | Hildreth | ................ | G06F 1/1686 348/208.1 |
| 8,077,143 B2 * | 12/2011 | Panabaker | ............... | G09G 5/14 345/156 |
| 8,593,558 B2 * | 11/2013 | Gardiner | ............... | G06F 1/1626 348/191 |
| 2006/0044268 A1 * | 3/2006 | Robin | .................. | G06F 1/1626 345/158 |
| 2012/0154276 A1 * | 6/2012 | Shin | ........................ | G06F 3/017 345/158 |
| 2013/0040737 A1 * | 2/2013 | Raghoebardajal | ...... | A63F 13/06 463/37 |
| 2013/0127838 A1 * | 5/2013 | Derrig | ..................... | G06T 15/00 345/419 |
| 2013/0176459 A1 * | 7/2013 | Yang | ....................... | H04N 5/232 348/231.99 |
| 2014/0098197 A1 * | 4/2014 | Geris | ................. | H04N 13/0296 348/48 |

OTHER PUBLICATIONS

Jain, Ramesh, Rangachar Kasturi, and Brian G. Schunck. Machine Vision. New York: McGraw-Hill, 1995. Print.*
López, Miguel Bordallo, et al. "Multimodal sensing-based camera applications." IS&T/SPIE Electronic Imaging. International Society for Optics and Photonics, 2011.*
Dillow, Clay. "Parrot AR.Drone 2.0 Review: Fly Higher, Farther, and More Intuitively." Popular Science. Popular Science, Jul. 3, 2012. Web. Dec. 9, 2015.*
Szeliski, Richard, and Sing Bing Kang. "Recovering 3D shape and motion from image streams using nonlinear least squares." Journal of Visual Communication and Image Representation 5.1 (1994): 10-28.*

* cited by examiner

*Primary Examiner* — Chan Park
*Assistant Examiner* — Geoffrey E Summers
(74) *Attorney, Agent, or Firm* — Polsinelli LLP

(57) ABSTRACT

Systems and approaches are provided for robustly determining the motion of a computing device. Multiple cameras on the device can each capture a sequence of images, and the images can be analyzed to determine motion of the device with respect to a user, an object, or scenery captured in the images. The estimated motion may be complemented with measurements from an inertial sensor such as a gyroscope or an accelerometer to provide more accurate estimations of device motion than can be provided by image data or inertial sensor data alone. A computing device can then be configured to detect device motion as user input such as to navigate a user interface or to remotely control movement of another electronic device.

20 Claims, 6 Drawing Sheets

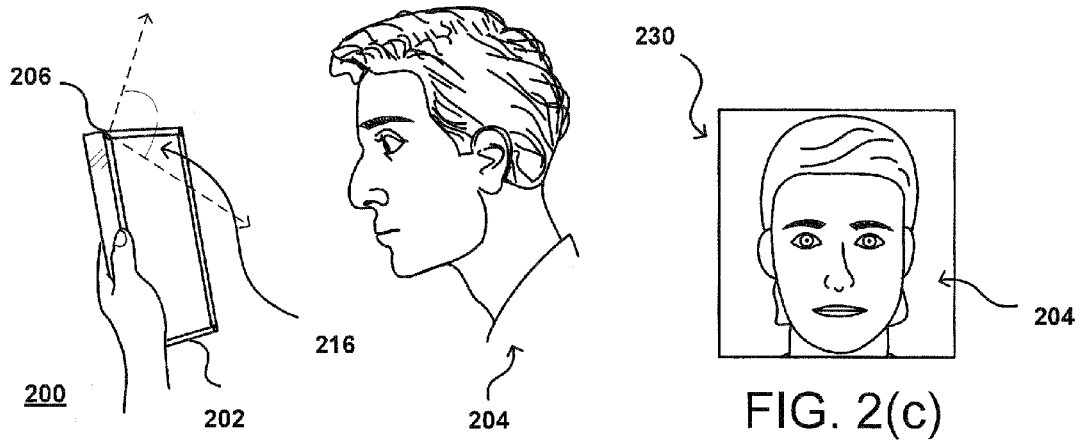
FIG. 2(a)
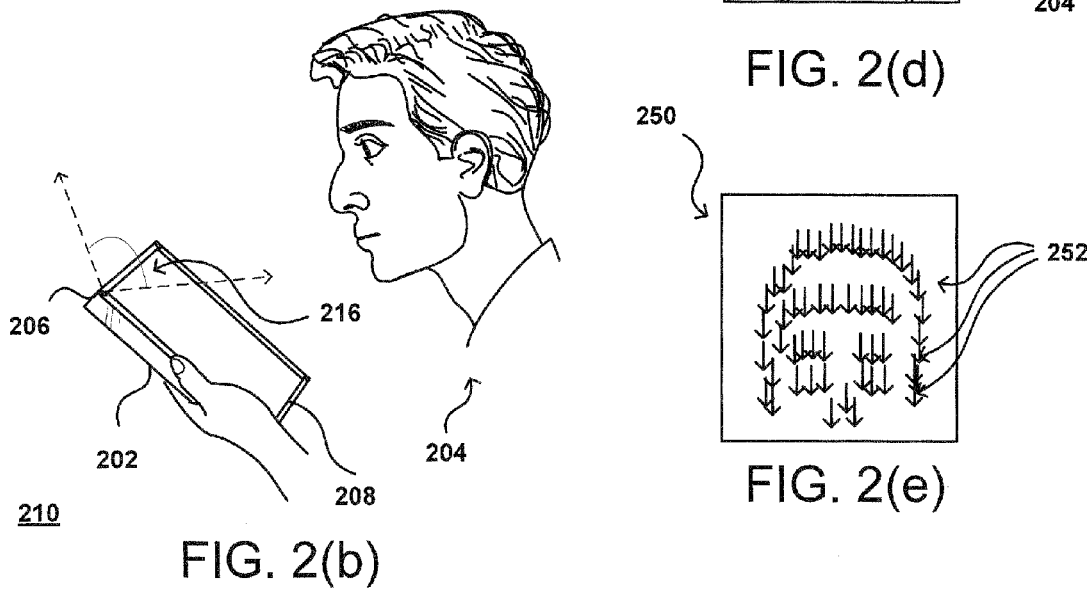
FIG. 2(b)
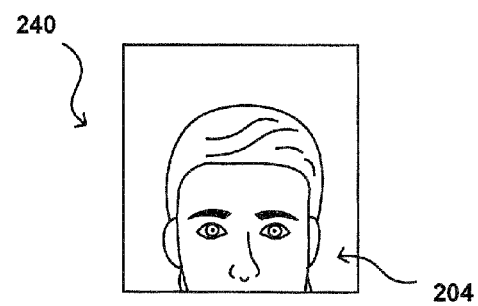
FIG. 2(c)
FIG. 2(d)
FIG. 2(e)

ROBUST DEVICE MOTION DETECTION

BACKGROUND

As personal electronic devices, such as laptop computers, tablets, smartphones, or portable media players, become increasingly sophisticated, people are able to interact with such devices in new and interesting ways. For instance, many personal electronic devices are able to determine device motion along at least one axis. This can allow a user, for example, to switch the orientation of content being displayed by the device from portrait mode to landscape mode. Some devices are able to detect device motion along two axes, which can enable a user, for example, to navigate content being displayed on the device from left-to-right and/or up-down by tilting the device left-right or up-down, respectively. Still other devices are able to monitor device motion along three axes to provide even more complex user interactions. Some conventional approaches may only rely on data from inertial sensors, such as an accelerometer, gyroscope, inclinometer, magnetometer, or some combination thereof, to detect device motion. However, an accelerometer cannot measure yaw (also referred to as heading or azimuth) directly, and may be overly sensitive to motion. A gyroscope does not provide absolute references and a gyroscope's bias noise can substantially drift over time. A magnetometer may be limited to measurements along a single axis (e.g., yaw), and can be highly susceptible to noise from magnetic field effects of device components as well as external sources like large metallic structures in the environment.

BRIEF DESCRIPTION OF THE DRAWINGS

Various embodiments in accordance with the present disclosure will be described with reference to the drawings, in which:

FIGS. 2(a)-2(e) illustrate examples of detecting device motion in accordance with various embodiments;

DETAILED DESCRIPTION

Systems and methods in accordance with various embodiments of the present disclosure may overcome one or more of the aforementioned and other deficiencies experienced in conventional approaches for determining device motion. In particular, various embodiments utilize image analysis techniques to determine motion between a computing device and a user, an object, or other scenery within the vicinity of the computing device. For example, the image data captured by a plurality of cameras of the device can be analyzed to attempt to determine motion of the device based at least in part upon changes to a at least a portion of the user, the object, or the other scenery captured by the cameras. Further, the estimated device motion may be complemented with the measurements of an accelerometer, gyroscope, inclinometer, magnetometer, or some combination thereof (collectively, referred to as "inertial sensors" herein), to provide more accurate estimations of device motion than using either approach alone. For instance, combining image analysis with the readings from an inertial sensor can result in greater robustness to feature tracking errors, fewer features required to recover device motion, and reduced ambiguity in the recovery of device motion.

Various other functions and advantages are described and suggested below in accordance with the various embodiments.

Figure 1A:
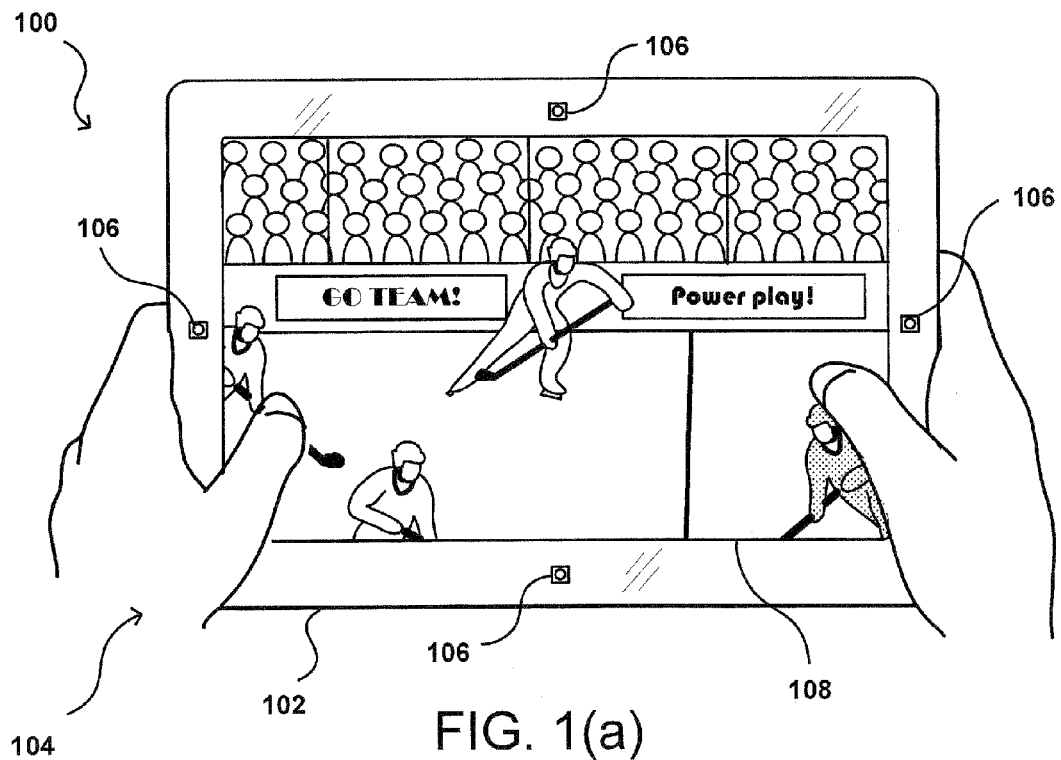
FIGS. 1(a)-1(b) illustrate an example of detecting device motion in accordance with an embodiment.

FIG. 1(a) illustrates an example situation 100 of a user 104 operating a computing device 102 for device motion detection in accordance with various embodiments. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In the example device 102, there are four cameras 106 on a same surface as a display screen 108 of the device, and each camera is located towards a center of an edge of the device. Using such an arrangement, the device will be more likely to have at least one or two cameras facing the user at any time unobstructed by objects, such as by the user 104 holding the device. In other embodiments, the cameras may be arranged at each corner of a front surface of the device facing the user. In still other embodiments, there may be more or fewer cameras on the front of the device and/or other surfaces of the device. Each camera 106 comprises a digital camera incorporating a CMOS image sensor. In other embodiments, an imaging element of a computing device can incorporate other image sensors (such as a charged couple device (CCD)) and/or can include multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. When the cameras 106 of the device 102 are used to detect device motion, the cameras of the device may be operated using zero shutter lag, video mode, or a similar approach to enable the device to be more responsive to motion of the device. The display screen 108 is a touchscreen comprising a plurality of capacitive touch sensors and capable of detecting the user's fingertip touching points of the screen as input for the device. In other embodiments, the display element may implement a different touch technology (e.g. resistive, optical, ultrasonic) or may not be capable of detecting a user's touch at all.

In this example, the user 104 can be seen interacting with the device 102, which is displaying a first-person perspective hockey video game on display screen 108. Unlike many conventional video gaming systems, here, there is no peripheral device, such as a joystick or a video game controller, connected to the computing device 102 for the user to interact with video game elements. Instead, the user can navigate his video game character by tilting the device 102 towards one of the eight cardinal or ordinal directions (e.g., N, NE, E, SE, S, SW, W, and NW). In some embodiments, a computing device may be able to detect even more precise device motions, such as towards directions between a cardinal and ordinal point (e.g., NNE, ENE, ESE, SSE, SSW, WSW, WNW, NNW). Although not illustrated in this example, the device 102 also includes one or more motion and/or orientation sensors, such as an accelerometer, gyroscope, inclinometer, magnetometer, or some combination thereof (e.g., inertial measurement unit (IMU)).

Figure 1B:
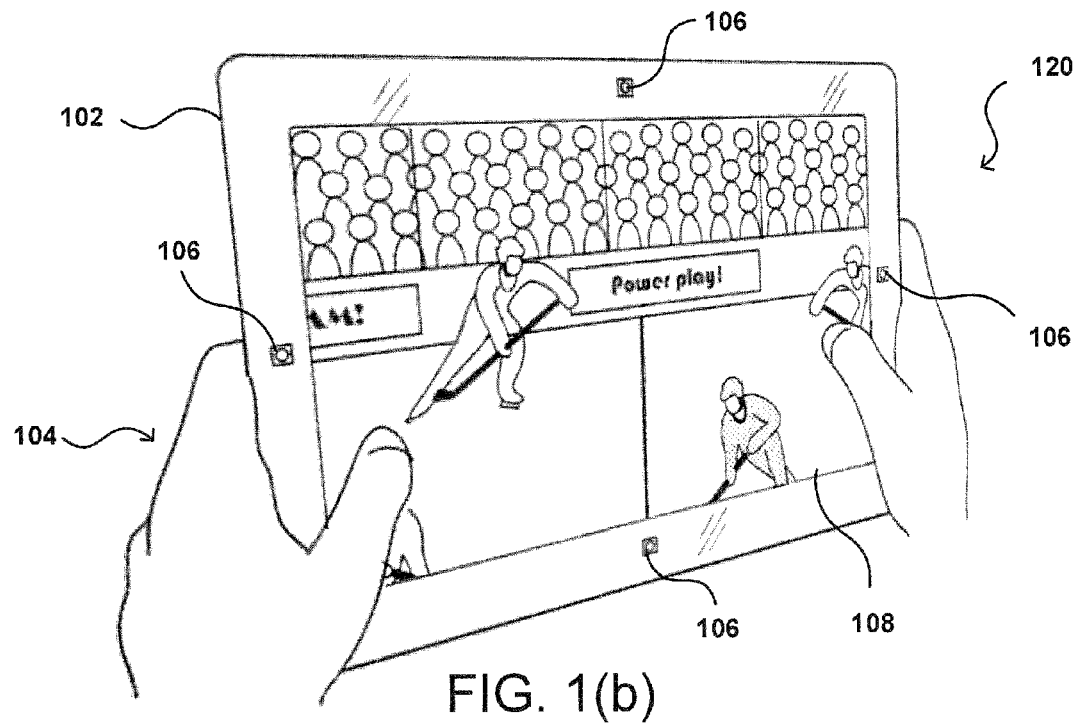

FIG. 1(b) illustrates an example situation 120 wherein the user 104 has tilted the device 102 laterally towards the right (i.e., eastward) to cause the first-person perspective displayed on display element 108 to be shifted towards the right. The speed with which the display of the first-person perspective moves corresponds to the extent the user 104 tilts the device. For example, a steep tilt angle will cause the display of the first-person perspective to move more quickly in the direction the device has been tilted while a more moderate tilt angle will cause the display to move in the user's intended direction at a slower pace. Thus, in addition to detecting a direction the device has been titled, the device 102 is also able to differentiate between various degrees of tilt and the speed at which the device is tilted. Further, the user can also zoom in and out of a current perspective by drawing the device closer to the user's face or further away from the user's face, respectively. In addition, the device can be configured to detect other video game character interactions, such as passing or shooting the puck. For example, when the user is in possession of the puck, the user 104 can tilt the device back towards his body and snap the device in the direction of an intended target to pass the puck to another video hockey player teammate or shoot the puck towards a goal. It will be appreciated that numerous device motions can be detected and mapped as various user inputs. The device 102 is configured to operate in this manner by capturing, using the cameras 106, first image data for each camera at a first instance of time (such as at the first moment depicted in FIG. 1(a)) and second image data for each camera at a second instance of time (such as at the second moment depicted in FIG. 1(b)) and comparing each set of the image data of each of the cameras to determine relative motion of the device with respect to the subject matter captured by the cameras. Inertial sensor data can also be acquired substantially at the same time as image capture, and the image data and inertial sensor data can be aggregated to obtain more accurate results for device motion, as well as other data such as the absolute position and orientation of the device. In such embodiments, the sampling rate of the inertial sensors may be configured to synchronize with the image capture rate of the cameras.

Systems and approaches in accordance with various embodiments are able to detect device motion based at least in part upon optical flow techniques. Optical flow is an approximation of motion of objects, surfaces, and edges in a given sequence of images. Approaches for determining optical flow can include phase-based methods, block-based methods, differential methods, and discrete optimization methods. Differential methods estimate optical flow by computing spatial and temporal derivatives, and can be classified as local methods that may optimize a local energy-like function and global methods which attempt to optimize a global energy function. Local methods can offer relatively highly robust estimations under noise, but do not give dense flow fields while global methods yield flow fields with 100% density, but can be more sensitive to noise. Optical flow is based on the assumption that all temporal intensity changes are due to motion only. This can be represented by:

$$I(x,y,t)=I(x+\delta x, y+\delta y, t+\delta t),$$

where I(x, y, t) is a center pixel in a n×n neighborhood of pixels and moves by δx, δy in time δt. For small displacements, a linearized Taylor series expansion yields the motion constraint equation:

$$\nabla I \cdot \vec{v} = -I_t,$$

where $\nabla I=(I_x, I_y)$ is the spatial intensity gradient and $\vec{v}=(v_x, v_y)$ is the image velocity or optical flow at pixel (x, y) at time t. The motion constraint equation is an ill-posed problem in that it yields one equation and two unknowns. This is a mathematical consequence of the aperture problem, wherein there may be insufficient local image intensity structure to measure full image velocity. A typical way to overcome the ill-posedness problems of differential optic flow methods is to use smoothing techniques and smoothness assumptions prior to differentiation to remove noise and to stabilize the differentiation process. Local methods use spatial constancy assumptions while global techniques supplement the optic flow constraint with a regularizing smoothness term.

In various embodiments, local approaches based on the Lucas-Kanade optical flow algorithm can be used to determine relative motion of a device. The algorithm is set forth in Lucas, Bruce D. et al. "An iterative image registration technique with an application to stereo vision." *In Proceedings of the 7th international joint conference on Artificial intelligence*. 1981, and is incorporated herein by reference. The Lucas-Kanade optical flow algorithm estimates displacement of a neighborhood of pixels by analyzing changes in pixel intensity from the known intensity gradients of the image in that neighborhood. As mentioned, for a simple pixel, there are two unknowns and one equation, such that the system is ill-posed or under-determined. Therefore, a neighborhood of pixels is used to derive additional equations to make the system over-determined. The system can then be solved using a least squares solution that averages the optical flow estimates over the neighborhood. The Lucas-Kanade method attempts to minimize:

$$\sum_{x,y \in \Omega} W^2(x, y)[\nabla I(x, y, t) \cdot \vec{v} + I_t(x, y, t)]^2,$$

where W(x,y) is a windowing function that gives more influence to constraints at the center of the neighborhood than those at the periphery. The result of the Lucas-Kanade algorithm is a set of optical flow vectors distributed over the image estimating movement of objects in the scene.

In other embodiments, a global approach, such as the Horn-Schunk optical flow algorithm or a variation thereof, can be used to determine relative motion of a device. The Horn-Schunk algorithm is set forth in Horn, Berthold K P et al. "Determining optical flow." *Artificial intelligence* 17, no. 1 (1981): 185-203, which is incorporated herein by reference. Horn-Schunk uses a global regularization calculation as an additional constraint. Horn-Schunk assumes that images consist of objects that undergo rigid motion such that optical flow will be smooth over relatively large areas of the image. The Horn-Schunk algorithm attempts to minimize:

$$\int_D (\nabla I \cdot \vec{v} + I_t)^2 + \lambda^2 \left[ \left(\frac{\partial v_x}{\partial x}\right)^2 + \left(\frac{\partial v_x}{\partial y}\right)^2 + \left(\frac{\partial v_y}{\partial x}\right)^2 + \left(\frac{\partial v_y}{\partial y}\right)^2 \right] dx dy$$

defined over the image domain D, where the magnitude of λ corresponds to the influence of the smoothness term.

In still other embodiments, an approach combining local and global optical flow methods can be used to determine device motion. Such a technique may be referred to as a combined local-global (CLG) method and is described in Bruhn, Andrés, Joachim Weickert, and Christoph Schnörr.

"Lucas/Kanade meets Horn/Schunck: Combining local and global optic flow methods." *International Journal of Computer Vision* 61, no. 3 (2005): 211-231, which is incorporated herein by reference.

FIGS. 2(*a*), (*b*), (*c*), (*d*), and (*e*) illustrate an example of an approach that can be used for determining device motion in accordance with various embodiments. In the example situation 200 of FIG. 2(*a*), a user 204 can be seen operating a computing device 202 that incorporates four cameras on each of a corner of the device. For purposes of avoiding redundancy, only camera 206 located near an upper left corner of a front face of the computing device 202 is illustrated here. It will be appreciated that the device 202 includes additional cameras on each of a corner of the device that operate similarly to camera 206. Camera 206 is used to capture image data of subject matter within the field of view 216 of the camera, here, the user 204. The field of view 216 of the camera 206 is such that the entirety of the face of the user is captured by the camera. Although image data of the user is captured in this example, other embodiments may capture other objects or scenery. For example, the user may be operating a computing device as a remote controller for a television, set top box, DVD player, video game console, etc. such that the user is not looking at the computing device and holding the device away from the user's face. In such circumstances, the computing device may instead capture image data of the user's surroundings, such as textures or objects corresponding to the floor or ceiling in a room in which the device is operated. Further, although the device incorporates four cameras in each of a corner of the front surface of the device in this example, it should be understood that there can be additional or alternative imaging elements of the same or a different type at various other locations on the device within the scope of the various embodiments. For instance, in some embodiments, a single camera can be used to capture image information in the field of view of the camera and relative motion can be determined by comparing image data at different intervals of time. In other embodiments, two cameras are used to capture image data, and stereographic and 3D optical flow techniques can be used to determine device motion. For example, two cameras can be positioned on the device with a sufficient separation such that the device can utilize stereoscopic imaging and optical flow to determine device motion in 3D. Each image captured by one of the cameras can be analyzed with at least one other image captured, at the same time or substantially the same time, by another of the cameras to determine a depth map for each pixel of the image. Since the motion of closer objects will be more pronounced than objects further away, the depth maps can be used to normalize motion vectors between images captured at different intervals of time. If software executing on the computing device (or otherwise in communication with the computing device) is able to determine information such as the angular field of view of the camera, the zoom level at which the image data is currently being captured, and any other such relevant information, the software can also determine an approximate position and orientation of the user with respect to the camera.

In the example situation 210 of FIG. 2(*b*), the user 202 has tilted the computing device 204 forward such that the user's entire face is no longer within the field of view 216 of camera 206. The user 202 may intend for such motion to cause the device to perform a computing task, such as navigating a user interface displayed on display element 208. In this example, the motion of the device can be estimated based on optical flow between first image data captured by the camera corresponding to FIG. 2(*a*) and second image data corresponding to FIG. 2(*b*). Examples of at least portions of the respective first and second image data of at least one camera, such as camera 206, are illustrated in FIGS. 2(*c*) and 2(*d*). In the example image data 230 of FIG. 2(*c*), the computing device is positioned such that the upper-left camera of the device is able to capture the entirety of the face of the user 204. In the example image data 240 of FIG. 2(*d*), after the user has tilted the device forward, the upper-left camera has been repositioned such that a portion of the face of the user 204 is no longer within the field of view of the camera. Image data 230 and 240 may be aggregated with image data from another corner camera to establish depth or distance using stereographic techniques, and the motion of the device can be estimated based on analyzing the changes between images 230 and 240. An approach in accordance with an embodiment may involve extracting "feature points" from the first and second image data. Features can be points of interests or key points within an image that will be relatively easy to track from one image to another, and may include edges (detected using, e.g., Canny edge detection), corners (detecting, using, e.g., Harris corner detection or Shi-Tomasi corner detection), or regions of interest (detected, using, e.g., LaPlacian of Gaussian pyramids or Difference of Gaussian pyramids). Next, at least some of the features extracted from the first image data are matched with at least some of the second feature of the second image data, and motion can be estimated from matching feature points. The vector pointing from the feature in the first image data to the corresponding feature in the second image data is the local motion vector for that feature. Then, the local motion vectors can be aggregated to estimate a global motion vector that would have resulted in the local motions. An example of the local motion vectors between first image data 230 and second image data 240 is illustrated in example image data 250 of FIG. 2(*e*). In the example of FIG. 2(*e*), the local motion vectors 252 are depicted as two-dimensional arrows pointing in the downward direction. As mentioned, image data from at least two cameras can be analyzed to determine motion in three dimensions. Further, two stereo pairs of cameras may be more likely to provide more accurate estimation of device motion than a single stereo pair of cameras.

In at least some embodiments, actual distances a device has been moved can also be determined. The cameras of the computing device can be calibrated to correlate an image pixel of image data captured by the cameras with an actual measurement of length. For example, the only motion each of the cameras can undergo is a rotation and a translation such that a first position P of a camera can be defined as (x, y, z). When the device is moved by a user, the second position P' of the camera can be defined as (x',y',z'), and the motion of the device can be represented as:

$$P' = R \cdot P + T$$

where R is a 3×3 rotation matrix and T is a 3×1 translation vector. The rotation matrix R has three degrees of freedom and the translation vector T also has three degrees of freedom.

In the example device of FIGS. 2(*a*) and (*b*), a camera is located at each corner of the device such that the positions of the cameras with respect to one another is known, and are related as follows:

$$d_{c1:c2} = c_1 \quad d_{c1:c3} = c_2$$

$$d_{c1:c4} = c_3 \quad d_{c2:c3} = c_4$$

$$d_{c2:c4} = c_5 \quad d_{c3:c4} = c_6$$

$$P_1' = R \cdot P_1 + T \quad P_2' = R \cdot P_2 + T$$

$$P_3' = R \cdot P_3 + T \quad P_4' = R \cdot P_4 + T$$

where $d_{m:n}$ is a distance between a camera m and a camera n, $c_n$ is a known constant, $P_n$ is a first position of the $n^{th}$ camera, and $P_n'$ is the second position of the $n^{th}$ camera. This is an over-determined system of equations, and can be solved using a least-squares computation. The motion of the device is determined by solving for R and T.

Figure 3A:
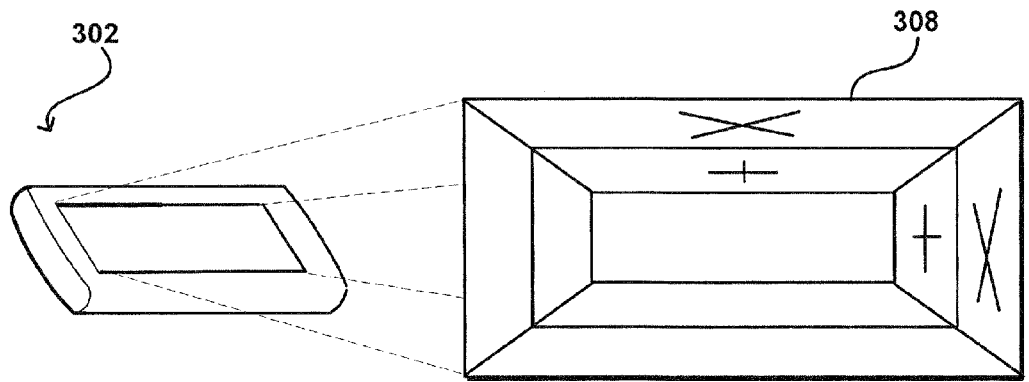
FIGS. 3(a)-3(d) illustrate examples of detecting device motion in accordance with various embodiments.
Figure 3B:
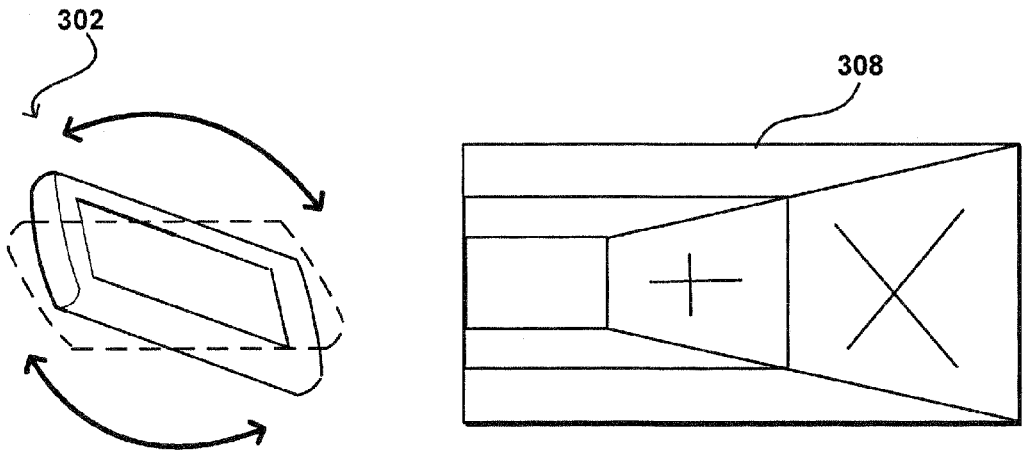
Figure 3C:
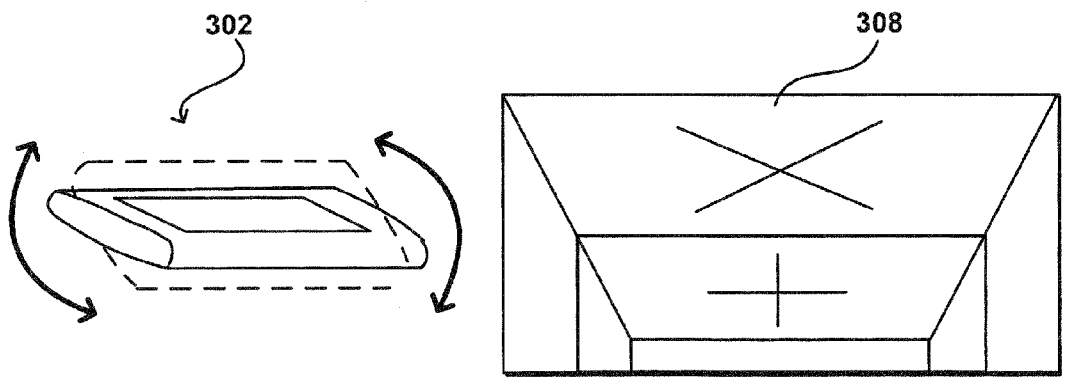
Figure 3D:
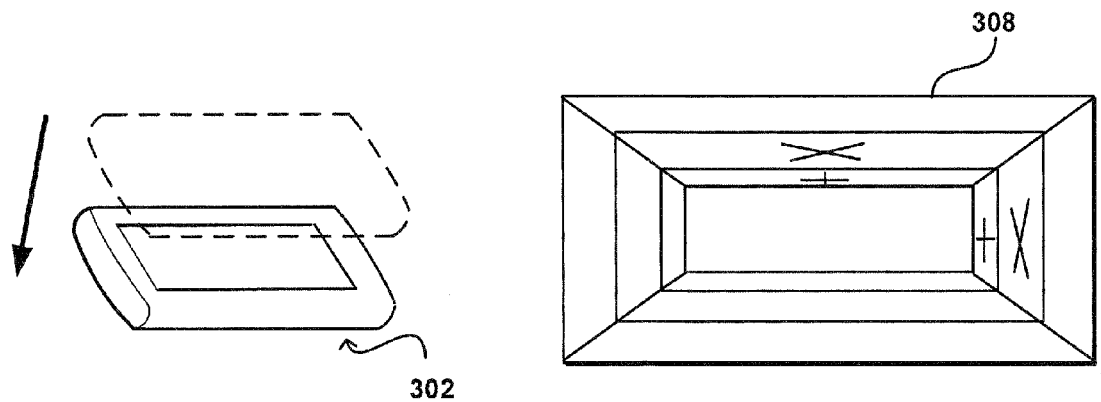

FIGS. 3(a), (b), and (c) illustrate an example of an application of device motion detection in accordance with various embodiments. In this example, a three-dimensional environment is represented using the two-dimensional display element 308 of a computing device 302. The computing device can include at least one camera to obtain image data, and may further include an element able to determine motion and/or orientation of the device independent from, or in conjunction with, the image data. As illustrated in FIG. 3(a), when the user holds the device steady at a first position, a relatively straightforward view of the three-dimensional environment is rendered on the display. A user seeing the display in FIG. 3(a) might wish to get a better view of the elements displayed towards the right of the screen, or elements that are "off screen" to the right. As illustrated in FIG. 3(b), the user can tilt the device to the right (or left) or perform a similar motion that will be detected by the device as input to rotate the field of view rendered for display. The image that is displayed then can show an improved view of elements or portions of the image that were previously to the right of the center of the image. Similarly, the user might want to view elements or portions above or below that which is currently displayed by the display element. As illustrated in FIG. 3(c), the user can tilt the device forward or back to change the displayed image such that the image provides a point of view that better illustrates portions that were previously above or below a center point of the previous image. As illustrated in FIG. 3(d), the user can also move the device upward or downward to respectively zoom in and out of elements depicted in display element 308. Thus, a user can change a point of view used to display the image by generating input through device motion. Additionally, in some embodiments, once the image that is displayed is altered to display the elements or portions of the image that were previously displayed away from the center of the image, the device can be configured to receive an input to "normalize" or adjust the displayed image so that the displayed area of interest is reoriented to the center of the displayed image (e.g., the displayed X portion moves to the center of the display). This allows the relative orientation between the user and the device to return to a normal perpendicular viewing orientation. For example and referring to FIG. 3(b), after altering the orientation of device and user so that the X element is the area of interest, the device receives an input from the user that updates the display so that, rather than the + element, the X element is centered on the displayed image and the user can return to a normal perpendicular viewing position with respect to the device. The reorientation can be selected using a cursor or touch screen, button selection or gesture, among other possibilities.

In some embodiments, detection of device motion as user input can be extended to other applications. For example, a computing device can be configured with a communication system such as a Wi-Fi, Bluetooth®, radio frequency (RE), near-field communication (NFC) component or similar communication or networking sub-system to enable communication with another electronic device incorporating a corresponding communication or networking system. The device can be further configured to remotely control the other electronic device, such as a pan-tilt-zoom camera, a remotely controlled car, helicopter, airplane, robot, or a similar moveable device using approaches discussed herein. For example, a user panning a computing device from left or right or tilting the device forward or backward can cause the moveable device to move left or right and forward or backward, respectively. Subject matter captured by the pan-tilt-zoom camera or a camera located on a moveable device can be displayed on a display element in such embodiments. In some embodiments, a computing device can be configured to control media content displayed on a media player, such as a television, set-top box, DVR player, or a video game console using the techniques described herein. For instance, the user tilting the device left or right can cause content being played on the media player to be rewound or fast-forwarded, respectively. Tilting the device forward may cause the content to be played and tilting the device may cause the content to be stopped. In the case of a television, tilting the device left or right may cause a television channel to be changed and tilting the device forward or backward may cause a change in the volume. In some embodiments, a computing device can be configured to be a peripheral device for a second computing device. The computing device can serve as a video game controller for a video game console in one embodiment. The computing device can be utilized as a mouse or other user input device for a locally located second computing device or the computing device can be utilized as a display and a user input device for a remotely located second computing device in other embodiments. Numerous other applications can be implemented using the approaches discussed herein, as will be appreciated to those of ordinary skill in the art.

As mentioned, various embodiments aggregate data from cameras and one or more inertial sensors to obtain more accurate device motion data than using image analysis or measurements from inertial sensors alone. When image data and inertial sensor data are used in a complementary manner, the relative positions and orientations of the cameras and inertial sensors must be accurately established. Errors in the estimated rotation and/or translation between the cameras and inertial sensors will introduce biases in the estimation for position and orientation of the device. Over time, these biases can cause the overall position and orientation error to grow unbounded. To address this issue, various embodiments may calibrate the cameras and inertial sensors of a computing device to determine the relative positions and orientations of the cameras and inertial sensors with respect to one another. Prior to calibrating the cameras and inertial sensors with respect to one another, the cameras and inertial sensors are individually calibrated. Inertial sensors are typically calibrated at production to determine the gain, alignment, and offset vector of the sensors. An inertial sensor's temperature dependency and g-sensitivity are also sometimes calibrated. Each camera is also individually calibrated to account for optical and geometric distortions. For example, lenses used in conventional cameras can be subject to various types of distortion such as radial distortion (e.g., barrel distortion or pin-cushion distortion), tangential distortion, scale error, projection distortion, skew, etc. These types of optical or geometric distortions can be corrected by determining the intrinsic parameters (e.g., focal length, principal point, pixel size, distortion coefficients) and extrinsic parameters (e.g., rotation, translation with respect to the body) of the camera. Various approaches can be used to derive a camera's intrinsic and extrinsic parameters, such as direct linear transformation (DLT), the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, which is incorporated herein by reference, and the algorithm set forth in Zhang, Zhengyou. "A flexible new technique for camera calibration." *Pattern Analysis and Machine Intelligence, IEEE Transactions on* 22, no. 11 (2000): 1330-1334, which is incorporated herein by reference.

Figure 4:
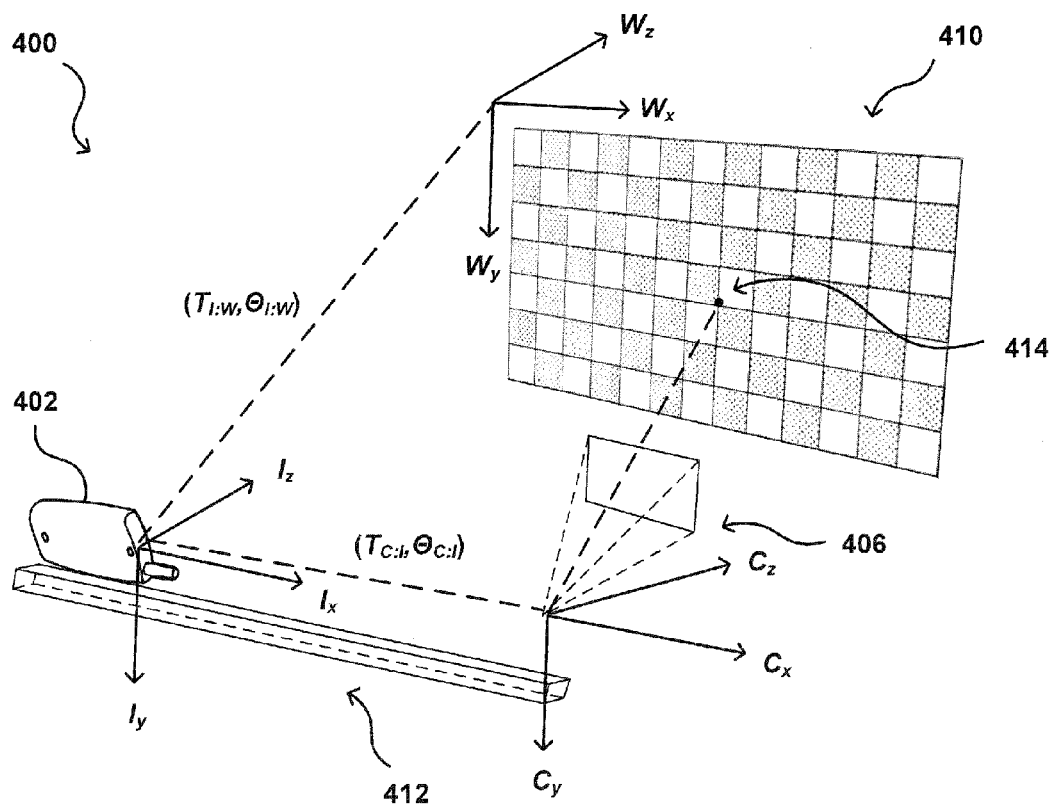
FIG. 4 illustrates an example approach for calibrating a computing device for device motion detection in accordance with an embodiment.

FIG. 4 illustrates an example approach for calibrating a computing device 402 for device motion detection in accordance with an embodiment. In this example, measurements from the inertial sensors and image data from the cameras (not illustrated) are acquired while the device faces a calibration pattern 410 and the device moves across a calibration rig 412 parallel to the calibration pattern. Known target points, such as example target point 414, are tracked, and an unscented Kalman filter can be applied to estimate the rotation and translation between the sensors. During calibration, multiple coordinate systems may be considered: one or more coordinate systems for each camera of the device, with an origin at the optical center of a camera and the z-axis aligned with the optical axis of the camera lens; one or more coordinate systems for each inertial sensor, with an origin at the center of the inertial sensor; and a world coordinate system, with an origin at the upper left-hand corner of the calibration. The world coordinate system serves an absolute frame of reference for the cameras and the inertial sensors. In some embodiments, the inertial sensors may be incorporated in an IMU, wherein the accelerometer and gyroscope (and sometimes a magnetometer) are fixed to a common chassis and not actively gimbaled to maintain a fixed orientation. In such systems, a single coordinate system can be used for the IMU. In some embodiments, the cameras may all be located on a same plane of the device such that a single camera may be calibrated and a translation between the calibrated camera and an uncalibrated camera can be applied to the uncalibrated camera to calibrate the uncalibrated camera. However, individual cameras can be subject to alignment errors (such as within the body of the computing device and between an image sensor and a camera lens), unique lens distortions, and other manufacturing tolerances or defects such that it may be preferable to calibrate each camera individually.

In FIG. 4, the world coordinate system corresponds to the $W_x$, $W_y$, $W_z$ axes; the coordinate system for the inertial sensors, here, assumed to be an IMU, corresponds to the $I_x$, $I_y$, $I_z$ axes; and the coordinate system for a single camera corresponds to the $C_x$, $C_y$, $C_z$ axes. Although only a single camera is shown to be calibrated in FIG. 4, it will be appreciated that the other cameras of the device 402 are similarly calibrated. The coordinate system for the IMU is related to the world coordinate system according to a translation $T_{I:W}$ and a rotation $\Theta_{I:W}$. The camera coordinate system is related to the coordinate system for the IMU according to a translation $T_{C:I}$ and a rotation $\Theta_{C:I}$. An unscented Kalman filter can be used to simultaneously estimate the position and orientation of the IMU with respect to the world coordinate system and the position and orientation of a camera with respect to the IMU. Such a system can be expressed as:

$$x = [P_{I:W} \Theta_{I:W} v_{I:W} b_a b_g P_{C:I} \Theta_{C:W}],$$

where $P_{I:W}$ is the position of the IMU in the world coordinate system, $\Theta_{I:W} = [\alpha \, \beta \, \gamma]$ is the vector of roll, pitch, and yaw of the coordinate system for the IMU with respect to the world coordinate system, $V_{I:W}$ is the linear velocity of the IMU in the world coordinate system, and $b_a$ and $b_g$ are the respective biases of the accelerometer and gyroscope. The parameters $P_{C:I}$ and $\Theta_{C:I}$ represent the respective position and rotation of the camera with respect to the IMU. These values are determined as part of the calibration process. The state transition model is driven by measurements obtained from the IMU for linear acceleration and angular velocity. The IMU accelerometer and gyroscope biases are modeled as Gaussian random walk models driven by white noise vectors $n_{aw}$ and $n_{gw}$, and the accelerometer and gyroscope measurements are assumed to be corrupted by zero-mean Gaussian noise vectors $n_a$ and $n_g$, respectively. Accordingly, the state transition model can be defined as:

$$\dot{\Theta}_{I:W} = \Gamma(\Theta_{I:W})\omega$$

$$\dot{P}_I = V_I, \, \dot{V}_I = C(\Theta_{I:W})a - g$$

$$\dot{b}_a = n_{aw}, \, \dot{b}_g = n_{gw}$$

$$\dot{r}_C = 0_{3\times 1}, \, \dot{\Theta}_{C:I} = 0_{3\times 1}$$

where $\Gamma$ is the kinematical matrix relating the rate of change of the Euler angles to the IMU angular velocity. C is a direction cosine matrix, and g is the gravity vector in the world coordinate system. The vectors a and $\omega$ are the linear acceleration and angular velocity, respectively, of the IMU in the coordinate system for the IMU. These values are related to the measured IMU linear acceleration, $a_m$, and angular velocity $\omega_m$, by:

$$a_m = a + b_a + n_a$$

$$\omega_m = \omega + b_g + n_g$$

After each IMU measurement, the state of the system is propagated forward in time until the next camera or IMU update using an integration algorithm, such as fourth-order Runge-Kutta integration. The control-input model is based on image data captured by the camera of known points on the calibration pattern 410 as the camera moves along the calibration rig 412. The points are tracked using a feature tracking algorithm, such as the Kanade Lucas Tomasi (KLT) feature tracker, after each image has been rectified to remove lens distortions. Measurements $q_i$ corresponding to projections of the target points $p_i$ in the camera images, at position $p_c$ in the camera coordinate system, can be used to determine the absolute position and orientation of the camera with respect to the world coordinate system:

$$p_C = \begin{bmatrix} x_i \\ y_i \\ z_i \end{bmatrix} = C(\Theta_{C:I})C(\Theta_{I:W})(p_i - p_I) - C(\Theta_{C:I})r_C$$

$$q_i = \begin{bmatrix} u_i \\ v_i \end{bmatrix} = h(x, p_i) + \eta_i = \begin{bmatrix} x'_i \\ y'_i \end{bmatrix} + \eta_i = K \begin{bmatrix} x_i/z_i \\ y_i/z_i \\ 1 \end{bmatrix}$$

where $[u_i, v_i]$ is the vector of observed image coordinates, K is the 3×3 camera intrinsic calibration matrix, and $\eta_i$ is a Gaussian measurement noise vector. The initial position of the camera with respect to the calibration pattern 410 can be determined using an iterative least squares computation, and a RANSAC procedure can be used to remove outliers due to tracking errors. To update the system state, an unscented Kalman filter can be applied to the state transition and measurement models to compute the a posteriori state mean and covariance.

Although the calibration rig 412 in FIG. 4 only enables device motion along the $I_x$ axis, it will be appreciated that multi-dimensional rigs are used for calibrating a device in other embodiments. For example, a two-dimensional calibration rig can be used to enable movement of the device along the $I_x$ and $I_y$ axes and calibration of the device according to these dimensions. In another embodiment, a three-dimensional calibration rig can be used to enable device movement along the $I_x$, $I_y$, and $I_z$ axes and calibration based on such dimensions. In still other embodiments, a multi-dimensional calibration rig can be used that can account for device rotations and calibration according to six degrees of freedom.

In various embodiments, aggregation of image analysis and measurements from inertial sensors can be loosely coupled or tightly coupled. A loosely coupled approach can comprise independent imaging and inertial navigation systems, running at different rates, and exchanging information. Translational and angular velocity estimates from the inertial sensors can be used to predict feature motion, and velocity estimates from image analysis can be used to bound integration errors in the inertial sensors. Prediction of feature motion can make the feature correspondence process more robust and can reduce the search space, thus reducing processing and use of power. A tightly coupled approach combines raw data of the cameras and inertial sensors in a single, optimum filter, such as a Kalman filter. Such approaches are well-known to those of ordinary skill in the art, and will not be discussed herein in detail.

Figure 5:
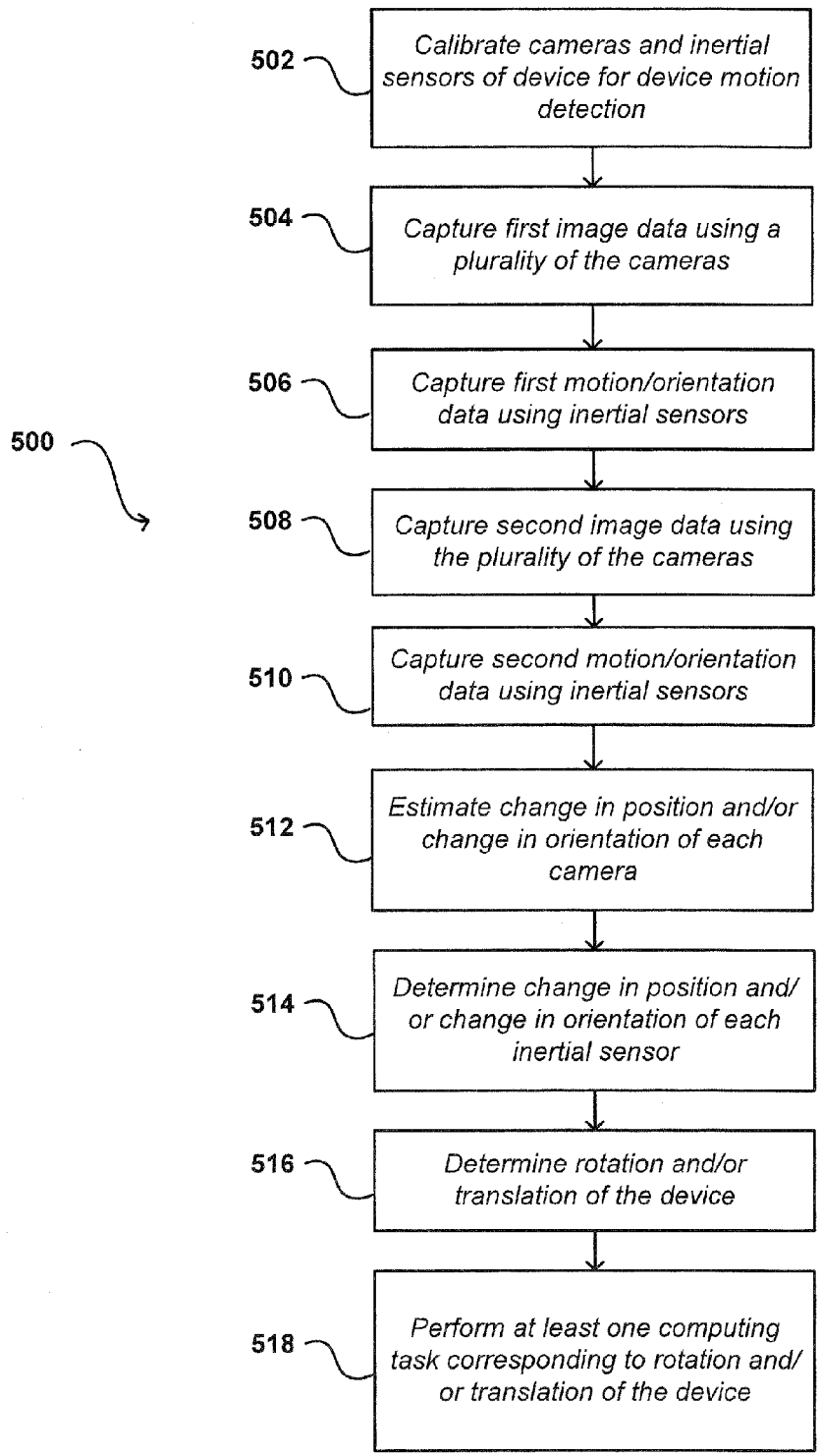
FIG. 5 illustrates an example process detecting device motion in accordance with an embodiment.

FIG. 5 illustrates an example process 500 for determining device motion in accordance with various embodiments. It should be understood, however, that there can be additional, fewer, or alternative steps performed in similar or alternative orders, or in parallel, within the scope of the various embodiments unless otherwise stated. In this example, the process begins by obtaining calibration data for the cameras and inertial sensors of a computing device 502. In various embodiments, the inertial sensors of a device can be calibrated to determine at least the gain, alignment, and offset matrices of the sensor. The gain matrix is a diagonal matrix containing the gain of every axis of the sensor. The alignment matrix specifies the direction of a sensor axis with respect to the sensor housing, and the offset matrix is the offset vector of the inertial sensor. In some embodiments, the temperature dependency and g-sensitivity of an inertial sensor can also be determined. In some embodiments, this calibration data can be provided by the manufacturer of the sensor. As mentioned, each camera of a computing device can also be calibrated to determine the intrinsic and extrinsic parameters using direct linear transformation, the Zhang algorithm, or the Tsai algorithm. Calibration typically occurs once and off-line, and the data obtained during this step can be re-used in subsequent calculations. In some cases, however, such as when a gyroscope or accelerometer is subjected to a large shock or when a magnetometer is mounted onto a ferromagnetic object, a device may have to recalibrated.

A computing device can be operated to detect device motion as user input in various ways. As optical flow-based device motion detection can consume a non-trivial amount of processing resources, memory, and power, it may be preferable for device motion detection to be activated upon start-up of an appropriate user application or via an explicit command by the user rather than to be executed as a background process executing throughout power-on of the device. For example, device motion detection can be activated upon loading a video game that recognizes device motion as user input or upon executing an application that enables a user to remotely control a television, set-top box, DVR player, video game console, or other such media player. When device motion detection is activated, image data from two or more cameras of a computing device can be continuously captured 504. The cameras may be operated using zero-shutter lag (ZSL) or a similar approach to enable the computing device to be more responsive to user movement of the device. The image data may be buffered and discarded after a determined period of time to the extent that device motion is not detected. In some embodiments, motion and/or orientation data can also be captured at substantially the same time as the first instance of time 506 using at least one inertial sensor of the computing device, such as an accelerometer, gyroscope, inclinometer, magnetometer, or some combination thereof. In some embodiments, the sampling rate of an inertial sensor may be configured to synchronize with the image capture rate of the cameras. In at least some embodiments, the readings from an inertial sensor can result in image data being tagged and prevented from being discarded based on the readings of the inertial sensor meeting or exceeding a threshold amount of device movement or rotation.

In some situations, a user may move the computing device from a first position to a second position. The computing device can be configured to ignore movement of the device below a threshold amount to avoid shaking, jitter, and other such unintended motions. When the user intentionally moves the device from the first position and remains at the second position for a threshold period of time, such as 0.500 ms, second image data may be captured using a plurality of cameras 508. It will be appreciated that the threshold period of time is only provided for illustrative purposes and can vary depending on the extent of responsiveness desired and the processing limitations of the computing device. In at least some embodiments, second motion and/or orientation data may also be captured substantially at the same time 510. First image corresponding to the first position and the second image data corresponding to the second position can be analyzed for each of the plurality of cameras to estimate a change in position and/or change in orientation of each camera 512. As mentioned, this can include detecting feature points in each of the first image data and second image data, determining correspondences between at least some feature points of the first image data and corresponding feature points of the second image data, and estimating the new position and orientation of each camera. Processes such as random consensus sampling (RANSAC) or least median of squares (LMS) can be used for verification against correspondence errors. In at least some embodiments, a change in position and/or change in orientation of each inertial sensor can also be determined 514. The data from each of the plurality of cameras (and inertial sensor data in at least some embodiments) can be aggregated and filtered to determine a rotation and translation of the device from the first position to the second position 516. A computing task can be performed corresponding to the determined rotation and/or translation of the computing device 518. As mentioned, this can include changing a perspective of content being displayed on a display element of the computing device, remotely controlling a moveable electronic device (e.g., pan-tilt-zoom camera, remotely controlled vehicle, robot, etc.), controlling playback of media content, or other applications discussed throughout herein.

Figure 6:
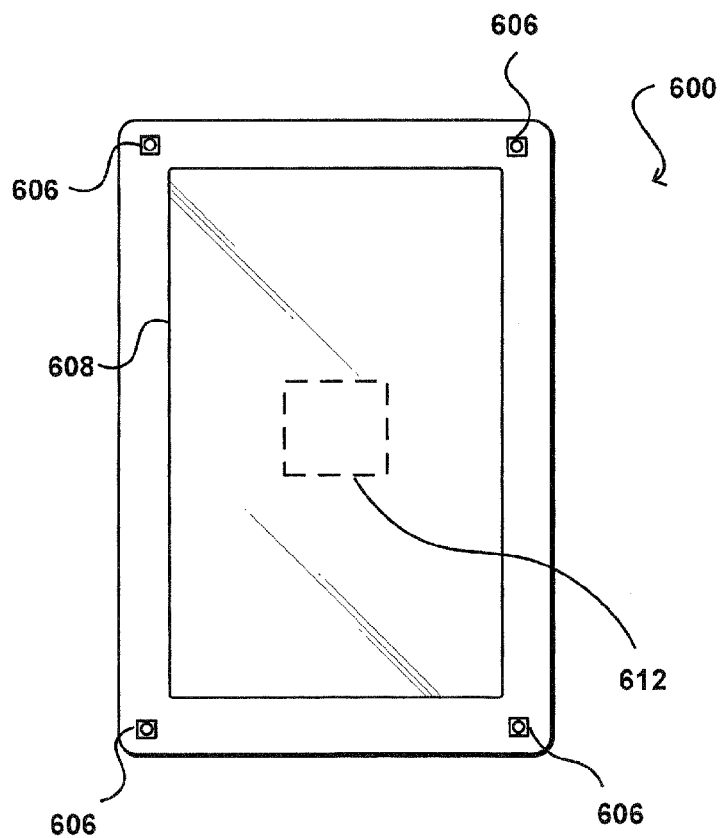
FIG. 6 illustrates an example of a computing device that can be used in accordance with various embodiments.
Figure 7:
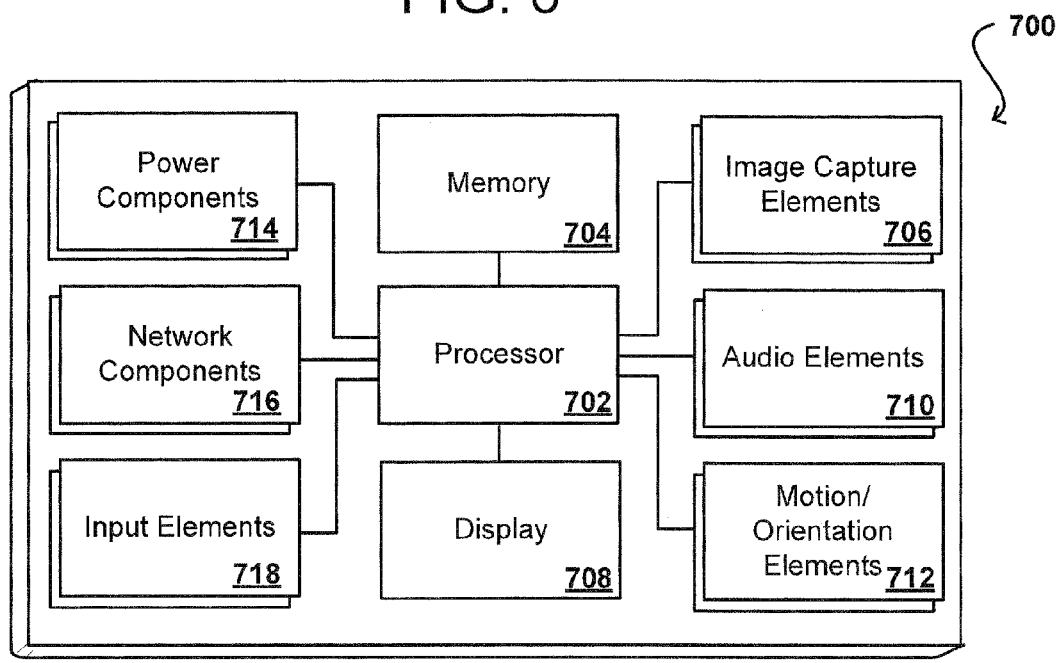
FIG. 7 illustrates an example configuration of components of a computing device such as that illustrated in FIG. 6.

FIG. 6 illustrates an example computing device 600 that can be used to perform approaches described in accordance with various embodiments. In this example, the device includes four cameras 606 located proximate to each corner of the display element 608, and enabling the device to capture images in accordance with various embodiments. The computing device also includes a motion and/or orientation element 612, such as an accelerometer, a gyroscope, an inclinometer, a magnetometer, or some combination thereof (e.g., an IMU). FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 708, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As mentioned, the device in many embodiments will include one or more cameras or image sensors 706 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 714 known in the art for providing power to a computing device, which can include capacitive charging elements for use with a power pad or similar device. The computing device can include one or more communication elements or networking sub-systems 716, such as a Wi-Fi, Bluetooth®, RF, wired, or wireless communication system. The device in many embodiments can communicate with a network, such as the Internet, and may be able to communicate with other such devices. In some embodiments the device can include at least one additional input device 718 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include one or more orientation and/or motion sensors 712. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (UPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

In some embodiments, the device 700 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 700 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 700 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
one or more processors;
a display element;
a first camera;
a second camera;
a third camera;
a fourth camera, the first camera, the second camera, the third camera and the fourth camera arranged on a same surface as the display element; and
memory including instructions that, when executed by the one or more processors, cause the computing device to:
capture a first image set of images at a first time using the first camera;
capture a second image at the first time using the second camera;
capture a third image at the first time using the third camera;
capture a fourth image at the first time using the fourth camera;
capture a fifth image at a second time using the first camera;
capture a sixth image at the second time using the second camera;
capture a seventh image at the second time using the third camera;
capture an eighth image at the second time using the fourth camera;
determine a first change in position of the first camera based at least in part by analyzing first feature points in the first image and first corresponding feature points in the fifth image;
determine a second change in position of the second camera based at least in part by analyzing second feature points in the second image and second corresponding feature points in the sixth image;
determine a third change in position of the third camera based at least in part by analyzing third feature points in the third image and third corresponding feature points in the seventh image;
determine a fourth change in position of the fourth camera based at least in part by analyzing fourth feature points in the fourth image and fourth corresponding feature points in the eighth image; and
determine at least one of a rotation or a translation of the computing device based at least in part upon the first change in position, the second change in position, the third change in position, the fourth change in position, a first distance between the first camera and the second camera, a second distance between the first camera and the third camera, a third distance between the first camera and the fourth camera, a fourth distance between the second camera and the third camera, a fifth distance between the second camera and the fourth camera, and a sixth distance between the third camera and the fourth camera.

2. The computing device of claim 1, wherein the instructions when executed further cause the computing device to:
determine a first depth map for the first image;
determine a second depth map for the second image;
determine a third depth map for the third image;
determine a fourth depth map for the fourth image;
determine a fifth depth map for the fifth image;
determine a sixth depth map for the sixth image;
determine a seventh depth map for the seventh image;
determine an eighth depth map for the eighth image;
determine first motion vectors for the first image;
determine second motion vectors for the second image;
determine third motion vectors for the third image;
determine fourth motion vectors for the fourth image;
determine fifth motion vectors for the fifth image;
determine sixth motion vectors for the sixth image;
determine seventh motion vectors for the seventh image;
determine eighth motion vectors for the eighth image;
normalize at least one of the first motion vectors or the fifth motion vectors using the first depth map and the fifth depth map;
normalize at least one of the second motion vectors or the sixth motion vectors using the second depth map and the sixth depth map;
normalize at least one of the third motion vectors or the seventh motion vectors using the third depth map and the seventh depth map; and
normalize at least one of the fourth motion vectors or the eighth motion vectors using the fourth depth map and the eight depth map.

3. The computing device of claim 1, wherein the instructions when executed further cause the computing device to:
display a first view of content on the display element; and
display a second view of the content based at least in part upon the at least one of the rotation or the translation of the computing device.

4. The computing device of claim 1, further comprising an inertial sensor, wherein the instructions when executed further cause the computing device to:
capture first sensor data at substantially the first time using the inertial sensor;
capture second sensor data at substantially the second time using the inertial sensor; and
determine a change in pose of the inertial sensor based at least in part by analyzing the first sensor data and the second sensor data,
wherein the at least one of the rotation or the translation of the computing device is further determined based at least in part upon the change in position of the inertial sensor.

5. A method for determining motion of a computing device, comprising:
determining a first change in position of a first camera of a computing device using a first image captured by the first camera at a first time and a second image captured by the first camera at a second time;
determining a second change in position of a second camera of the computing device using a third image captured by the second camera at the first time and a fourth image captured by the second camera at the second time;
determining a third change in position of a third camera of the computing device using a fifth image captured by the third camera at the first time and a sixth image captured by the third camera at the second time;

determining a fourth change in position of a fourth camera of the computing device using a seventh image captured by the fourth camera at the first time and an eighth image captured by the fourth camera at the second time; and determining at least one of a rotation or a translation of the computing device based at least in part upon the first change in position, the second change in position, the third change in position, the fourth change in position, a first distance between the first camera and the second camera, a second distance between the first camera and the third camera, a third distance between the first camera and the fourth camera, a fourth distance between the second camera and the third camera, a fifth distance between the second camera and the fourth camera, and a sixth distance between the third camera and the fourth camera.

6. The method of claim 5, further comprising:
determining a first depth map for the first image;
determining a second depth map for the second image;
determining a third depth map for the third image;
determining a fourth depth map for the fourth image;
determining a fifth depth map for the fifth image;
determining a sixth depth map for the sixth image;
determining a seventh depth map for the seventh image;
determining an eighth depth map for the eighth image;
determining first motion vectors for the first image;
determining second motion vectors for the second image;
determining third motion vectors for the third image;
determining fourth motion vectors for the fourth image;
determining fifth motion vectors for the fifth image;
determining sixth motion vectors for the sixth image;
determining seventh motion vectors for the seventh image;
determining eighth motion vectors for the eighth image;
normalizing at least one of the first motion vectors or the second motion vectors using the first depth map and the second depth map;
normalizing at least one of the third motion vectors or the fourth motion vectors using the third depth map and the fourth depth map;
normalizing at least one of the fifth motion vectors or the sixth motion vectors using the third depth map and the fourth depth map; and
normalizing at least one of the seventh motion vectors or the eighth motion vectors using the seventh depth map and the eighth depth map.

7. The method of claim 5, wherein determining at least one of the rotation or the translation of the computing device includes:
calculating a least-squares computation based at least in part upon the first change in position, the second change in position, the third change in position, the fourth change in position, the first distance, the second distance, the third distance, the fourth distance, the fifth distance, and the sixth distance.

8. The method of claim 5, further comprising:
capturing first sensor data at substantially the first time using an inertial sensor of the computing device;
capturing second sensor data at substantially the second time using the inertial sensor; and
determining a change in position of the inertial sensor based at least in part by analyzing the first sensor data and the second sensor data,
wherein the at least one of the rotation or the translation of the computing device is further determined based at least in part upon the change in position of the inertial sensor.

9. The method of claim 8, further comprising:
calibrating the first camera to determine at least one of a rotation or a translation of the first camera with respect to the inertial sensor.

10. The method of claim 8, further comprising:
synchronizing a sampling rate of the inertial sensor with an image capture rate of the first camera.

11. The method of claim 8, wherein the first image is captured in response to the first sensor data satisfying a first condition, and the second image is captured in response to the second sensor data satisfying a second condition.

12. The method of claim 5, further comprising:
displaying a first view of content on a display element of the computing device; and
displaying a second view of the content on the display element based at least in part upon the at least one of the rotation or the translation of the computing device.

13. The method of claim 5, further comprising:
causing an electronic device to move in a direction corresponding to the at least one of the rotation or the translation of the computing device, the electronic device comprising one of a pan-tilt-zoom camera, a remotely controlled vehicle, or a remotely controlled robot.

14. The method of claim 5, further comprising:
navigating a user interface displayed on a display element of the computing device based at least in part upon the at least one of the rotation or the translation of the computing device.

15. The method of claim 5, further comprising:
sending a remote control command to at least one of a television, a set-top box, a DVR player, a video game console, or other media player, the remote command corresponding to the at least one of the rotation or the translation of the computing device.

16. The method of claim 5, wherein the first camera is configured to operate in a zero shutter lag mode.

17. A non-transitory computer-readable storage medium storing instructions for determining motion of a computing device, the instructions when executed by one or more processors causing the computing device to:
determine a first change in position of a first camera of the computing device using a first image captured by the first camera at a first time and a second image captured by the first camera at a second time;
determine a second change in position of a second camera of the computing device using a third image captured by the second camera at the first time and a fourth image captured by the second camera at the second time;
determine a third change in position of a third camera of the computing device using a fifth image captured by the third camera at the first time and a sixth image captured by the third camera at the second time;
determine a fourth change in position of a fourth camera of the computing device using a seventh image captured by the fourth camera at the first time and an eighth image captured by the fourth camera at the second time; and
determine at least one at least one of a rotation or a translation of the computing device based at least in part upon the first change in position, the second change in position, the third change in position, the fourth change in position, a first distance between the first camera and the second camera, a second distance between the first camera and the third camera, a third distance between the first camera and the fourth camera, a fourth distance between the second camera and the third camera, a fifth distance between the second camera and the fourth camera, and a sixth distance between the third camera and the fourth camera.

18. The non-transitory computer-readable storage medium of claim 17, wherein the instructions when executed further cause the computing device to:
   display a first view of content on a display element of the computing device; and
   display a second view of the content on the display element based at least in part upon the at least one of the rotation or the translation of the computing device.

19. The non-transitory computer-readable storage medium of claim 17, wherein the instructions when executed further cause the computing device to:
   navigate a user interface displayed on a display element of the computing device based at least in part upon the at least one of the rotation or the translation of the computing device.

20. The non-transitory computer-readable storage medium of claim 17, wherein the instructions when executed further cause the computing device to:
   send a remote control command to at least one of a television, a set-top box, a DVR player, a video game console, or other media player, the remote corresponding to the at least one of the rotation or the translation of the computing device.

\* \* \* \* \*